(12) United States Patent
Poole et al.

(10) Patent No.: US 7,440,958 B2
(45) Date of Patent: *Oct. 21, 2008

(54) TRUSTED ACCESS BY AN EXTENDIBLE FRAMEWORK METHOD

(75) Inventors: Rebecca L. Poole, San Jose, CA (US); Laurence E. England, Morgan Hill, CA (US); Howard J. Glaser, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 53 days.

This patent is subject to a terminal disclaimer.

(21) Appl. No.: 11/356,774

(22) Filed: Feb. 17, 2006

(65) Prior Publication Data

US 2006/0143247 A1    Jun. 29, 2006

Related U.S. Application Data

(63) Continuation of application No. 10/347,566, filed on Jan. 17, 2003, now Pat. No. 7,035,860.

(51) Int. Cl.
*G06F 17/00* (2006.01)
*G06F 9/44* (2006.01)

(52) U.S. Cl. .................... 707/100; 707/1; 707/200; 709/206; 715/205; 715/207; 717/110; 717/120

(58) Field of Classification Search ............ 707/1, 707/100, 200; 709/206; 715/205, 207; 717/110, 717/120

See application file for complete search history.

(56) References Cited

U.S. PATENT DOCUMENTS

2002/0169781 A1* 11/2002 Poole et al. ............ 707/100

OTHER PUBLICATIONS

Klaus R. Dittrich et al., Database in software engineering: a roadmap, ACM 2000, pp. 293-302.*
Christian Nentwich et al., Flexible consistency Checking, 2001, pp. 1-31.*

(Continued)

*Primary Examiner*—Shahid Alam
*Assistant Examiner*—Fred I Ehichioya
(74) *Attorney, Agent, or Firm*—Rabindranath Dutta; Prentiss W. Johnson; Konrad Raynes & Victor LLP

(57) ABSTRACT

Appropriate actions are identified and associated with a selected artifact in a framework providing a customized application program. A metamodel is specified for a capture of relevant information pertaining to the selected artifact. This metamodel is implemented as a plugin which is integratable into the framework and which allows other plugins of the framework to access the relevant information pertaining to the selected artifact. A collection artifact is generated containing an empty instantiation of the metamodel in which an instantiation of the metamodel may be stored, and the collection artifact is sent to a target platform. On the target platform, the collection artifact containing an instance of the selected artifact is instantiated, and each instantiation of the selected artifact instance contains attributes, characteristics, and a replica of the selected artifact's content. The instantiated collection artifact is transmitted back to the framework, and the selected artifact's attributes and characteristics contained in the instantiated collection artifact are analyzed to ascertain appropriate access and actions allowed on the selected artifact.

5 Claims, 4 Drawing Sheets

OTHER PUBLICATIONS

Jeng et al., An Approach to Designing Reusable Service Frameworks via Virtual Service Machine, 2001, ACM, pp. 58-66.*

Doppke et al., Software Process Modeling and Execution within Virtual Environments, 1998, ACM, pp. 1-40.*

* cited by examiner

US 7,440,958 B2

TRUSTED ACCESS BY AN EXTENDIBLE FRAMEWORK METHOD

CROSS-REFERENCE TO RELATED APPLICATIONS

This application is a continuation of application Ser. No. 10/347,566 filed on Jan. 17, 2003, which is incorporated herein by reference in its entirety.

COPYRIGHT PROTECTION

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to computer programs and files, and more particularly to an association between a computer program and a file.

2. Description of the Related Art

Users developing e-business applications on an integrated development environment (IDE) are challenged with the need to uniquely identify and associate various file types and artifacts from multiple disparate platforms with the appropriate viewers, editors, and transformation tools compatible with the characteristics and attributes of those objects. Use of an inappropriate viewer, editor, or transformation tool may not only cause the selected action to fail, it may also corrupt a file and cause a loss of data.

For example, IBM S/390 files do not have an associated file type (IBM and S/390 are registered trademarks of International Business Machines Corporation in the United States, other countries, or both). If a S/390 file is downloaded to a user workstation, the need exists to correctly identify this S/390 file based upon its file attributes and characteristics. The need also exists to subsequently designate the correct association with tools available on the IDE which may operate on this S/390 file, as well as ascertain and designate an appropriate level of accessibility of this file. These needs are critical in the preservation of the file's integrity and accessibility.

Thus a user needs a way to uniquely identify and associate a file type with an artifact based upon an analysis of the file's attributes and characteristics.

The user also needs to associate a unique and easily discernible visual cue to the file or artifact to allow easy and rapid identification among the other file types or artifacts which may have originated from similar or disparate platforms which also reside within the integrated development environment.

The user also needs to associate appropriate and specialized actions to the file or artifact to allow the user to interact with it in a manner consistent and correct with its originating platform. This includes actions which may be performed back on the originating platform (e.g. compile, link, etc.).

The user also needs to deduce whether or not the file or artifact is read-only or read-writable based upon the attributes of the file or artifact as well as the user's authorization privileges.

These needs apply to files and artifacts which are brought into the IDE from the different platforms as well as file and artifacts which are created on the IDE platform.

There is also a need to identify the source from where the file or artifact originated so that an action to be performed on the artifact is forwarded to the appropriate platform, e.g., if the artifact is an IBM OS/390 COBOL program which originated on a OS/390 system, then a compilation and linkedit should preferably be performed on the OS/390 system from where the artifact originated (OS/390 is a registered trademark of International Business Machines Corporation in the United States, other countries, or both).

There is also a need for a mechanism to uniquely identify and associate various files and artifacts from multiple disparate platforms with the appropriate viewers, editors, and transformation tools to provide correct interaction with the files and artifacts in a manner consistent to its originating platform.

Correctly associating the appropriate viewers, editors, and transformation tools to the files and artifacts from the multiple disparate platforms in concert with the capability to correctly deduce accessibility attributes reduces the corruption of files and loss of data which otherwise may be caused through the accidental or intentional usage of inappropriate viewers, viewers and transformation tools on the files and artifacts.

Conventional systems and methods have failed to provide all of the above advantages. Thus, there is a clearly felt need for a method of, system for, article of manufacture, and computer program product for providing remote installation and deployment with these advantages.

SUMMARY OF THE INVENTION

The present invention comprises a method, system, article of manufacture, and a computer program product for identifying and associating appropriate actions to a selected artifact in a framework providing a customized application program. A metamodel is specified for a capture of relevant information pertaining to the selected artifact. This metamodel is implemented as a plugin which is integratable into the framework and which allows other plugins of the framework to access the relevant information pertaining to the selected artifact. A collection artifact is generated containing an empty instantiation of the metamodel in which an instantiation of the metamodel may be stored, and the collection artifact is sent to a target platform. On the target platform, the collection artifact containing an instance of the selected artifact is instantiated, and each instantiation of the selected artifact instance contains attributes, characteristics, and a replica of the selected artifact's content. The instantiated collection artifact is transmitted back to the framework, and the selected artifact's attributes and characteristics contained in the instantiated collection artifact are analyzed to ascertain appropriate access and actions allowed on the selected artifact.

One aspect of a preferred embodiment of the present invention generates the collection artifact by a builder plugin associated with the metamodel plugin in response to a request to access the selected artifact.

In another aspect of a preferred embodiment of the present invention, the collection artifact comprises an XML METADATA INTERCHANGE (XMI) metadata file containing empty instantiations of the metamodel (XMI is either a registered trademark or trademark of Object Management Group, Inc. in the United States and/or other countries.)

In another aspect of a preferred embodiment of the present invention, the sending of the collection artifact to the target platform is performed by a communicating plugin responsible for communicating to other platforms and for retrieving artifacts from those other platforms.

In another aspect of a preferred embodiment of the present invention, the allowable action is an invocation of an additional processing plugin which may process the selected artifact.

In another aspect of a preferred embodiment of the present invention, the processing plugin is a viewer.

In another aspect of a preferred embodiment of the present invention, the processing plugin is a browser.

In another aspect of a preferred embodiment of the present invention, the processing plugin is an editor.

In another aspect of a preferred embodiment of the present invention, the processing plugin is a transformational tool.

In another aspect of a preferred embodiment of the present invention, the plugin is an MOF-enabled Java file generated from an XMI metamodel schema generated from a UNIFIED MODELING LANGUAGE (UML) representation of the metamodel (MOF, UNIFIED MODELING LANGUAGE, and UML are trademarks of Object Management Group, Inc. in the United States and/or other countries.).

A preferred embodiment of the present invention has the advantage of identifying file types and artifacts based upon an analysis of a file's attributes and characteristics.

A preferred embodiment of the present invention has the further advantage of associating file types and artifacts based upon the analysis of a file's attributes and characteristics.

A preferred embodiment of the present invention has the further advantage of associating file types and artifacts with appropriate tools compatible with the characteristics and attributes of those file types which may operate on those file types, such as viewers, editors, and transformation tools.

A preferred embodiment of the present invention has the further advantage of associating appropriate or specialized actions to a file or artifact to allow a user to interact with it in a manner consistent and correct with its originating platform.

A preferred embodiment of the present invention has the further advantage of identifying and associating both local file types and artifacts and those from multiple disparate platforms with the tools compatible with the characteristics and attributes of those objects.

A preferred embodiment of the present invention has the further advantage of identifying and associating file types and artifacts to ascertain and designate an appropriate level of accessibility A preferred embodiment of the present invention has the further advantage of identifying an originating platform from where the file and artifacts originated so that an action to be performed on the file may be forwarded to the originating platform. For example if the artifact is an OS/390 COBOL program, then actions comprising a compilation and linkedit may be forwarded back back to an originating OS/390 platform where the artifact originated for the actions to be performed on the OS/390 platform.

A preferred embodiment of the present invention has the further advantage of associating a visual cue with the file or artifact to provide improved identification of the file or artifact from among other file types or artifacts which may have originated from similar or disparate platforms.

A preferred embodiment of the present invention has the further advantage of providing improved file integrity.

A preferred embodiment of the present invention has the further advantage of providing improved file accessibility.

A preferred embodiment of the present invention has the further advantage of reducing the corruption of files and loss of data through the accidental or intentional usage of inappropriate viewers, viewers and transformation tools on the files and artifacts.

BRIEF DESCRIPTION OF THE DRAWINGS

For a more complete understanding of the present invention and the advantages thereof, reference is now made to the Description of the Preferred Embodiment in conjunction with the attached Drawings, in which.

DESCRIPTION OF THE PREFERRED EMBODIMENT

An embodiment of the invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements may be used without departing from the spirit and scope of the invention. It will be apparent to a person skilled in the relevant art that this invention may also be employed in a variety of other devices and applications.

Figure 1:
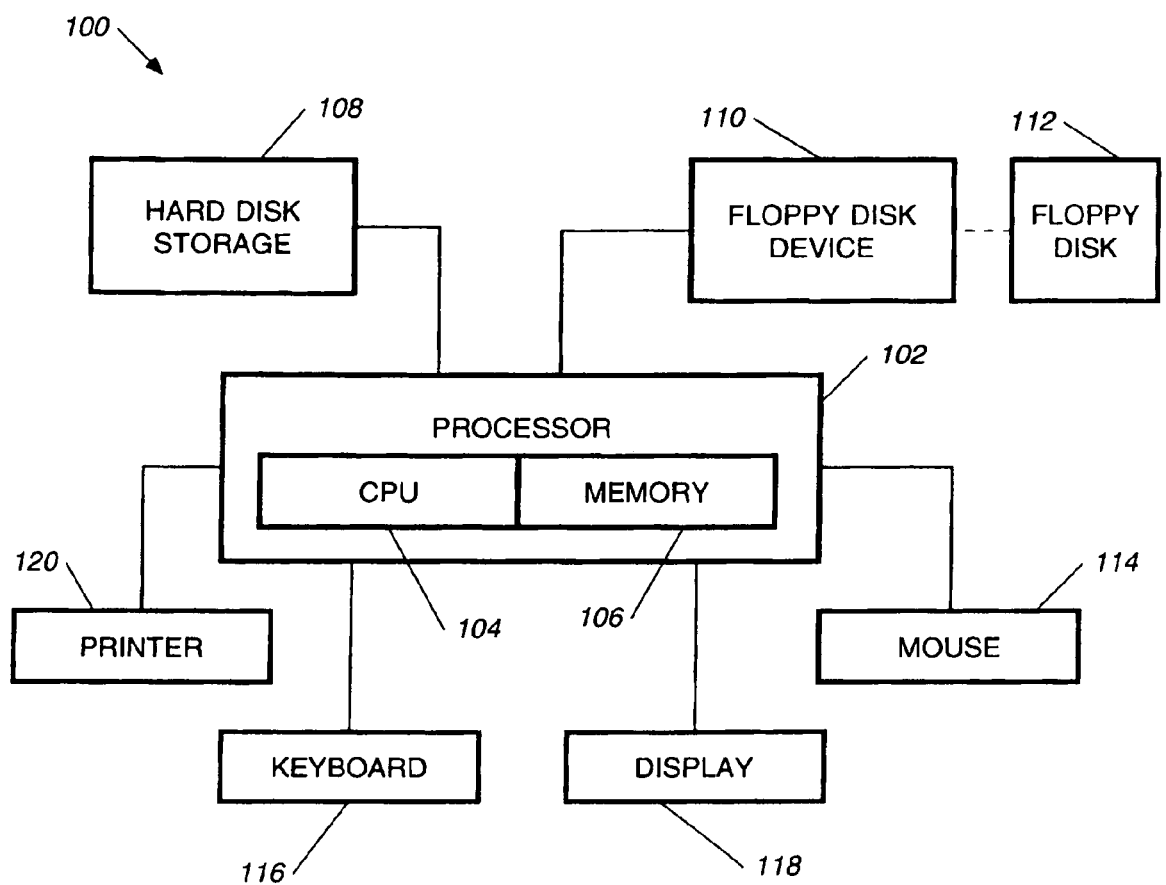
FIG. 1 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

With reference now to the figures, and in particular with reference to FIG. 1, there is depicted a pictorial representation of a computer system 100 which may be utilized to implement a method, system, article of manufacture, data structure, and computer program product of preferred embodiments of the present invention. The block diagram of FIG. 1 illustrates a computer system 100 used in performing the method of the present invention, forming part of the apparatus of the present invention, and which may use the article of manufacture comprising a computer-readable storage medium having a computer program embodied in said medium which may cause the computer system to practice the present invention. The computer system 100 includes a processor 102, which includes a central processing unit (CPU) 104, and a memory 106. Additional memory, in the form of a hard disk file storage 108 and a computer-readable storage device 110, is connected to the processor 102. Computer-readable storage device 110 receives a computer-readable storage medium 112 having a computer program embodied in said medium which may cause the computer system to implement the present invention in the computer system 100. The computer system 100 includes user interface hardware, including a mouse 114 and a keyboard 116 for allowing user input to the processor 102 and a display 118 for presenting visual data to the user. The computer system may also include a printer 120.

Figure 2:
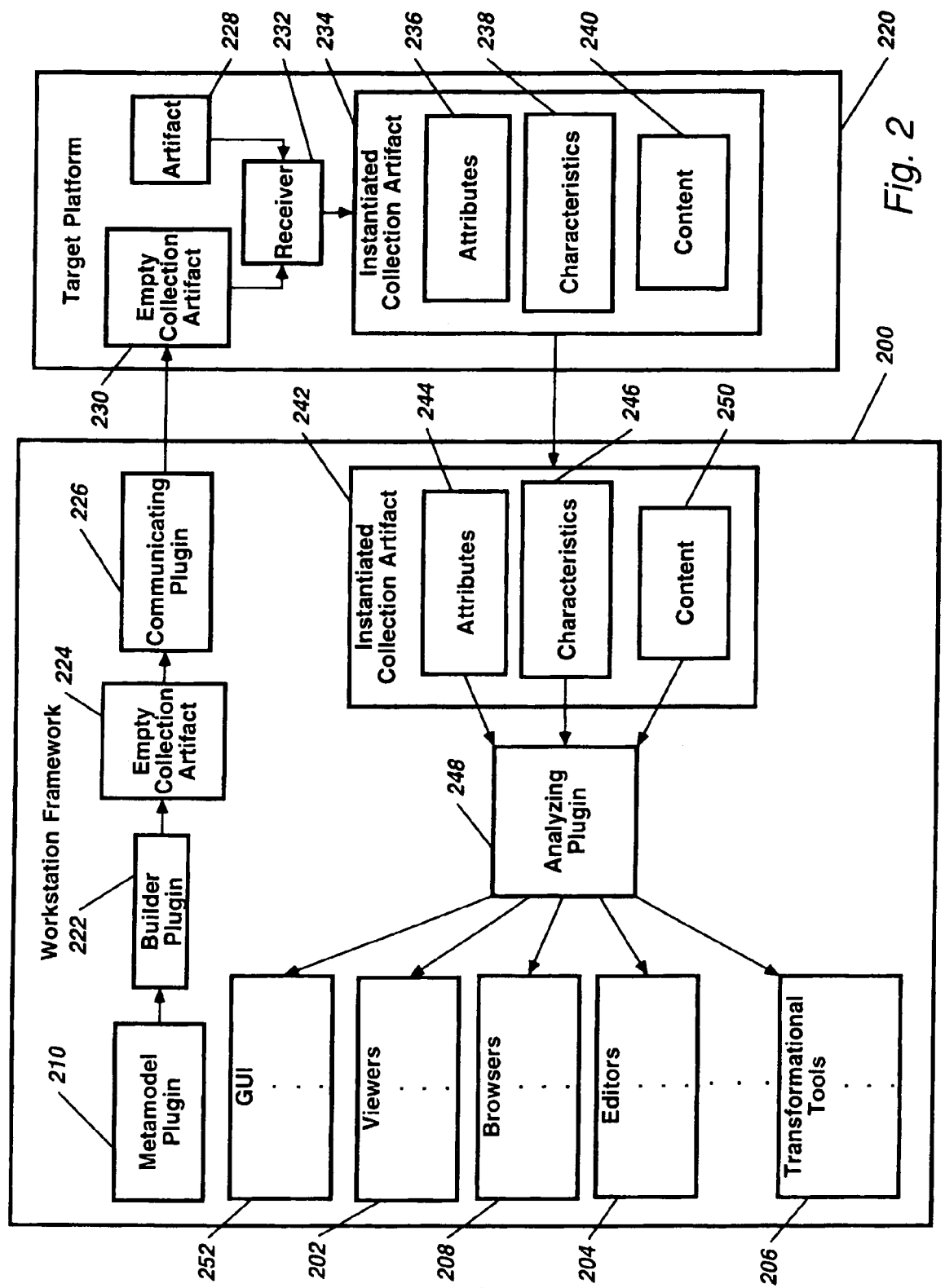
FIG. 2 is a block diagram of a framework and a target server preferred in carrying out a preferred embodiment of the present invention.

Referring now to FIG. 2, a block diagram of a preferred embodiment of the present invention illustrates an IDE framework 200 which uses a mechanism for plugin tools or components to provide a customized IDE 200 with the appropriate viewers 202, editors 204, and transformation tools 206 to support an e-business developer's needs. The preferred embodiment provides a solution for correctly identifying and associating appropriate actions such as browsers 208, editors 204, and transformation tools 206 which may be appropriately used on an artifact 228, such as a file, in compliance with the rules of an originating platform 220 from which the artifact 228 originated. The identification and association of appropriate actions is provided through the employment of a metamodel 234 where the artifact's metadata such as attributes 236 and characteristics 238 as well as an actual faithful replica of the artifact's content 240 are instantiated when the artifact 228 is exported from its originating platform 220 and read when the artifact 228 is imported into the IDE platform 200 where the artifact 228 may be manipulated in the IDE 200. This metamodel is realized as a metamodel plugin 210 which is accessible to other plugins located within the IDE 200. The metamodel plugin 210 determines appropriate actions which may be performed upon the artifact 228 based upon an analysis of the metadata information 244 and 246 of the artifact 242 performed by an analyzing plug-in 248.

For example, if a specified target artifact 228 to be retrieved into the IDE 200 is an IBM OS/390 COBOL file, then on the OS/390 side 220, the preferred embodiment of the present invention instantiates an instance 234 of the metamodel with the attributes 236 and characteristics 238 such as the target artifact's OS/390 file member's name, owning partition dataset, partition dataset information, Resource Access Control Facility (RACF) authorization and accessibility levels, and record format (RACF is a registered trademark of International Business Machines Corporation in the United States, other countries, or both). The instantiated instance 234 of the specified target artifact 228 in the form of an XMI metadata file is transferred to the IDE 200 where the appropriate plugins residing in the IDE 200 open the XMI metadata file 242 to ascertain the file's accessibility and appropriate allowable actions by a specific set of viewers 202, editors 204, and transformation tools 206. If the end-user initiates an editor action against the file's content 250, then the invoked editor 204 interacts with the file's content 250 in a manner compliant with how an editor on OS/390 220 edits the artifact's content 250 sensitive to file record length and any other file content specifications. Likewise, if the end-user intitiates a remote compile/link on the artifact's content 250, then the artifact's content 250 along with any pertinent file attribute 244 and characteristic 246 such as environment information is transmitted back to the target OS/390 system 220 for processing on the target OS/390 system 220, and the results of the remote compile/link transformation action are subsequently transmitted back to the IDE 200.

Figure 3:
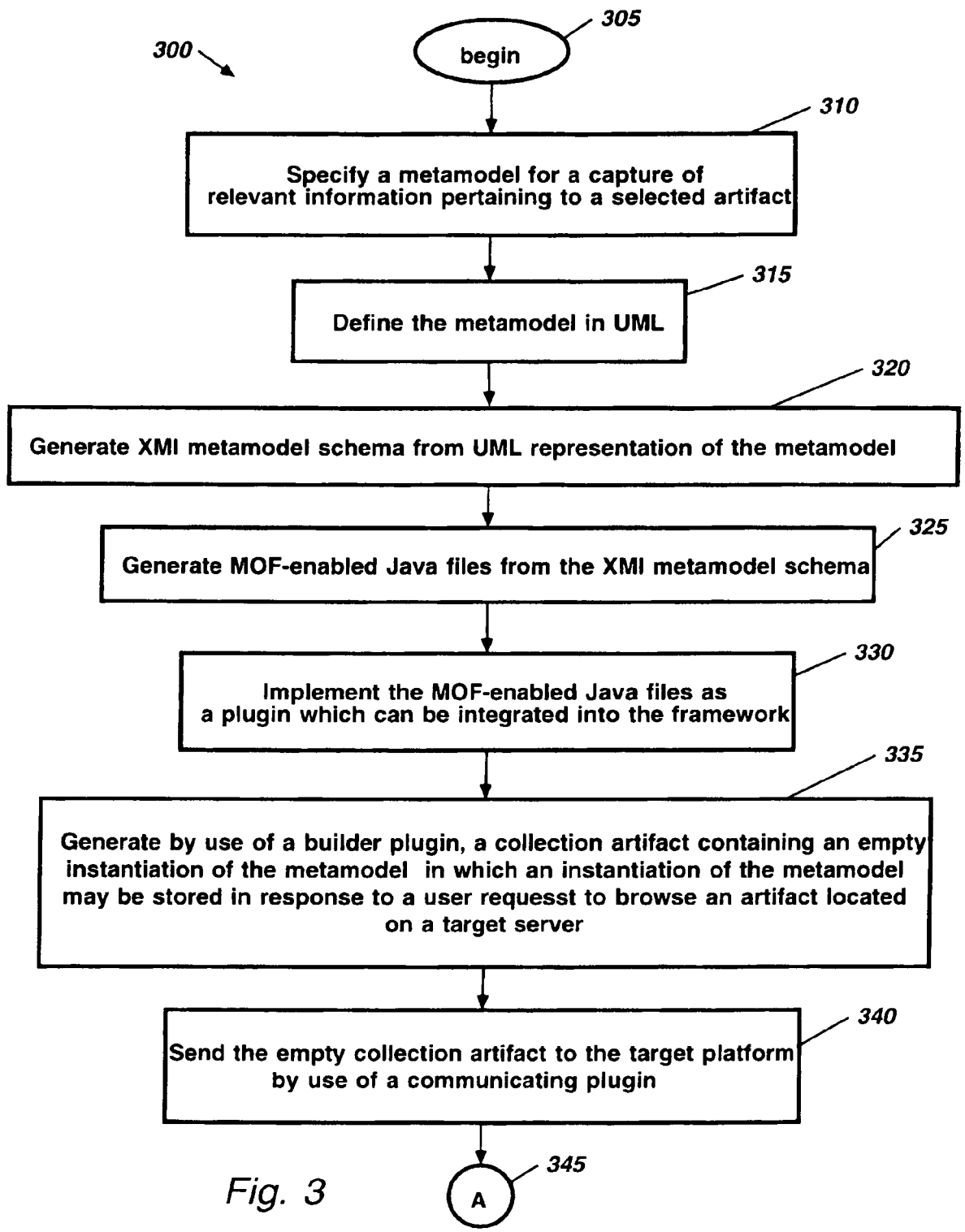
FIG. 3 and FIG. 4 are flowcharts of method steps preferred in carrying out a preferred embodiment of the present invention.
Figure 4:
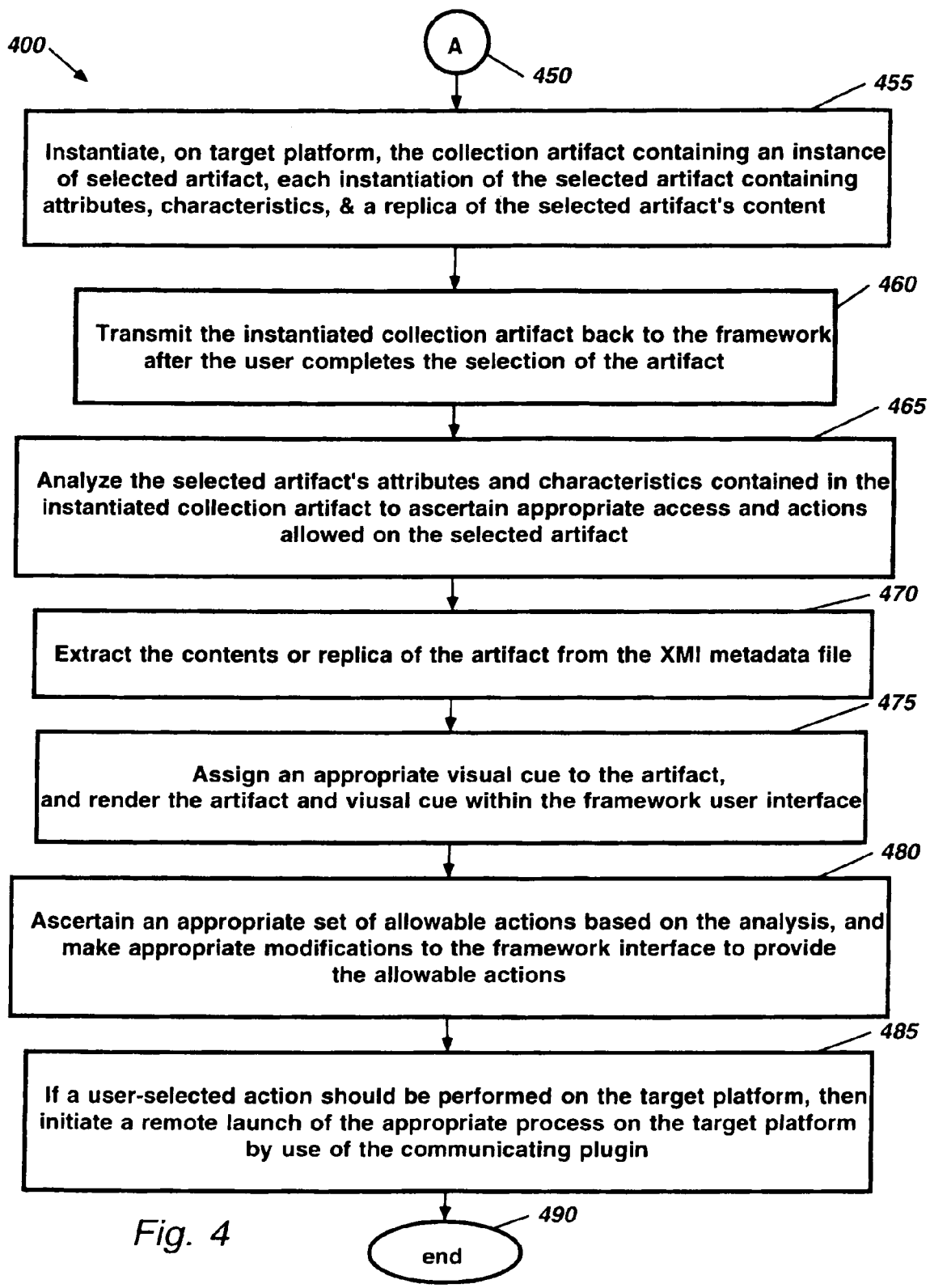

Referring now to FIGS. 3 and 4, the flowcharts 300 and 400 illustrate the operations preferred in carrying out the preferred embodiment of the present invention. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

After the start 305 of the process 300, process block 310 specifies a metamodel which allows for the capture of relevant information of the artifacts pertinent across the multiple disparate platforms, and thereafter, process block 315 defines this metamodel in a UML representation. Using the UML representation of the metamodel, process block 320 generates the corresponding XMI metamodel schema for the metamodel. Process block 325 next uses the above generated XMI metamodel schema to generate corresponding MOF enabled Java files for the XMI metamodel. This generated MOF-enabled Java code allows the user to programmatically instantiate the metamodel and subsequently manipulate the metamodel via modifications, deletions, and additions of the metamodel instantiation. The generated MOF enabled Java files are implemented by process block 330 as a metamodel plugin 210 which may be integrated into the IDE framework 200. This allows other plugins 202, 204, 206, and 208 of the IDE framework 200 access to the attributes 244, characteristics 246 and other information pertaining to the artifact which may not reside within the file. The metamodel plugin 210 may then be employed to transfer files from the target platform 220 into the IDE 200. When the end-user submits the request to browse within the IDE 200 available files located on a target server 220, a builder plugin 222 associated with the metamodel plugin 210 generates an empty collection artifact 224, as illustrated in process block 335, which allows for the storage of an instantiation of the metamodel. This empty collection artifact 224 is realized as an XMI metadata file 224 containing an empty instantiation of the metamodel. Process block 340 then fires the communicating plugin 226 responsible for communicating to other servers 220 in order to retrieve artifacts 228. This communicating plugin 226 transmits the empty collection artifact 224 realized as an XMI metadata file to the target platform 220. Thereafter, processing continues to decision block 455 on FIG. 4. This processing path is illustrated by flowchart connectors A, 345 on FIG. 3 and 450 on FIG. 4.

Referring now to FIG. 4, after the empty collection artifact message 230 arrives at the target platform 220 and is handled by the receiving program 232, process block 455 instantiates an XMI metadata file 234 for each artifact selected by the user. Each instantiation of the XMI instance file contains the attributes 236, characteristics 238 and an actual faithful replica of the target artifact's content 240. When the user has completed the selection of the set of artifacts 228 that the user wishes to transfer, process block 460 transmits the XMI metadata file 234 back to the IDE 200. The XMI metadata file 242 as received by the framework 200 contains instantiations 242 of the metamodel for each selected artifact.

Once the XMI metadata file 242 is received by the IDE 200, an analyzing plugin 248 residing in the IDE 200 opens the XMI metadata file 242 and analyzes the selected artifact's attributes 244 and characteristics 246 contained the instantiated collection artifact 242 to ascertain appropriate access and actions allowed on the selected artifact 242 by a specific set of viewers, editors and transformation tools, process block 465. Based upon this analysis, process block 470 extracts an actual faithful replica 250 of the target file from the XMI metadata file 242 and renders the replica 250 on the IDE's file navigation viewer window within the IDE GUI 252. An appropriate visual cue is assigned to the artifact by process block 475 to denote one or more of it's attributes 244 and characteristics 246, such as if it is read-only or read-write. In addition, process block 480 ascertains an appropriate set of allowable actions for the file or artifact, and makes appropriate contributions to the IDE's menu bar, task bar and/or pop-up menu bar for when the file or artifact gains context focus within the IDE 200. These actions allow for the invocation of additional plugins which may process the file either in a browser 208, editor 204, or tranformation capacity 206.

If the user interacts with the artifact 242 which originated from a different platform 220 rather than the platform of the IDE 200, the actions presented to the user via the menu bar, task bar, or pop-up menu bar are only the set of actions appropriate to the artifact 242 based upon the above analysis of the artifact's attributes 244 and characteristics 246. Thus, if the user selects an action which should be performed on the originating platform 220, then process block 485 activates the communicating plugin 226 to initiate a remote launch of the appropriate process on the target originating platform 220 based upon information such as the target originating platform 220 that was conveyed to the IDE 200 via the XMI metadata file 242. The necessary calling parameters are instantiated with the correct information by the plugin performing the remote server invocation. The process then ends at process block 490.

Using the foregoing specification, the invention may be implemented using standard programming and/or engineering techniques using computer programming software, firmware, hardware or any combination or sub-combination thereof. Any such resulting program(s), having computer readable program code means, may be embodied within one or more computer usable media such as fixed (hard) drives, disk, diskettes, optical disks, magnetic tape, semiconductor memories such as Read-Only Memory (ROM), Programmable Read-Only Memory (PROM), etc., or any memory or transmitting device, thereby making a computer program product, i.e., an article of manufacture, according to the invention. The article of manufacture containing the computer programming code may be made and/or used by executing the code directly or indirectly from one medium, by copying the code from one medium to another medium, or by transmitting the code over a network. An apparatus for making, using, or selling the invention may be one or more processing systems including, but not limited to, central processing unit (CPU), memory, storage devices, communication links, communication devices, servers, input/output (I/O) devices, or any sub-components or individual parts of one or more processing systems, including software, firmware, hardware or any combination or sub-combination thereof, which embody the invention as set forth in the claims. User input may be received from the keyboard, mouse, pen, voice, touch screen, or any other means by which a human may input data to a computer, including through other programs such as application programs, databases, data sets, or files.

One skilled in the art of computer science will easily be able to combine the software created as described with appropriate general purpose or special purpose computer hardware to create a computer system and/or computer sub-components embodying the invention and to create a computer system and/or computer sub-components for carrying out the method of the invention. Although the present invention has been particularly shown and described with reference to a preferred embodiment, it should be apparent that modifications and adaptations to that embodiment may occur to one skilled in the art without departing from the spirit or scope of the present invention as set forth in the following claims.

We claim:

1. A computer implemented method of identifying and associating appropriate actions to a selected artifact in a framework providing a customized application program, said method comprising the steps of:

specifying a metamodel for a capture of relevant information pertaining to the selected artifact;

implementing the metamodel as a plugin, said plugin being integratable into the framework and allowing another plugin of the framework to access the relevant information pertaining to the selected artifact;

generating a collection artifact containing an empty instantiation of the metamodel in which an instantiation of the metamodel may be stored;

sending, from the framework, the collection artifact to a target platform;

instantiating, on the target platform, the collection artifact containing an instance of the selected artifact, each instantiation of the selected artifact instance containing attributes characteristics, and a replica of the selected artifact's content;

transmitting the instantiated collection artifact back to the framework; and analyzing the selected artifact's attributes and characteristics contained in the instantiated collection artifact to ascertain appropriate access and actions allowed on the selected artifact, wherein association of any action with the selected artifact is performed in compliance with rules of an originating platform from which the selected artifact is generated.

2. The method of claim 1 wherein the collection artifact is generated by a builder plugin associated with the metamodel plugin in response to a request to access the selected artifact.

3. The method of claim 2 wherein the collection artifact comprises an XMI metadata file containing empty instantiations of the metamodel.

4. The method of claim 1 wherein the allowed actions include an invocation of an additional processing plugin which may process the selected artifact.

5. The method of claim 4 wherein the plugin is an MOF-enabled Java file generated from an XMI metamodel schema generated from a UML representation of the metamodel.

* * * * *